United States Patent
Kan et al.

(10) Patent No.: US 10,909,044 B2
(45) Date of Patent: Feb. 2, 2021

(54) ACCESS CONTROL DEVICE, ACCESS CONTROL METHOD, AND RECORDING MEDIUM CONTAINING ACCESS CONTROL PROGRAM

(71) Applicant: NEC Corporation, Tokyo (JP)

(72) Inventors: Masaki Kan, Tokyo (JP); Jun Suzuki, Tokyo (JP); Yuki Hayashi, Tokyo (JP); Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 16/095,727

(22) PCT Filed: Apr. 17, 2017

(86) PCT No.: PCT/JP2017/015426
§ 371 (c)(1),
(2) Date: Oct. 23, 2018

(87) PCT Pub. No.: WO2017/188036
PCT Pub. Date: Nov. 2, 2017

(65) Prior Publication Data
US 2019/0171584 A1 Jun. 6, 2019

(30) Foreign Application Priority Data
Apr. 27, 2016 (JP) .................................. 2016-088941

(51) Int. Cl.
*G06F 12/14* (2006.01)
*H04L 29/06* (2006.01)
(Continued)

(52) U.S. Cl.
CPC .......... *G06F 12/1458* (2013.01); *G06F 9/468* (2013.01); *G06F 12/00* (2013.01);
(Continued)

(58) Field of Classification Search
CPC combination set(s) only.
See application file for complete search history.

(56) References Cited

U.S. PATENT DOCUMENTS 6,766,424 B1 * 7/2004 Wilson ................ G06F 12/0813
711/148
8,521,977 B2 8/2013 Ueki et al.
(Continued)

FOREIGN PATENT DOCUMENTS

JP 2006-344090 A 12/2006
JP 2013-130976 A 7/2013
(Continued)

OTHER PUBLICATIONS

Atchley Kattt, "Spark—Lightning-Fast Cluster Computing", National Science Foundation Expeditions in Computing, Obtained online on Nov. 1, 2018, <https://amplab.cs.berkley.edu/projects/spark-lightning-fast-cluster-computing/>, 2 pages total.
(Continued)

*Primary Examiner* — Yong J Choe

(57) ABSTRACT

To avoid degradation of access performance and resource use efficiency when a multi-node system utilizing a resource-disaggregated architecture makes data access across nodes under the control of software and the like which are not compatible with the resource-disaggregated architecture, an access control unit 410-1 is a unit included in an access control system 2, wherein remote access from a first processor 420-1 to a second information processing resource 440-2 is made via first and second communication networks, and is equipped with: a determination part 411-1 for determining whether or not the access made by the first processor 420-1 is remote access; and an access conversion part 412-1 for converting, when the access is remote access, the remote access to local access by updating access destination management information 432-1 such that the second
(Continued)

information processing resource is associated with a first information processing device.

8 Claims, 7 Drawing Sheets

(51) Int. Cl.
  *G06F 13/10* (2006.01)
  *G06F 13/14* (2006.01)
  *G06F 12/00* (2006.01)
  *G06F 9/46* (2006.01)
  *G06F 21/62* (2013.01)
  *H04L 29/08* (2006.01)

(52) U.S. Cl.
  CPC .............. *G06F 13/10* (2013.01); *G06F 13/14* (2013.01); *G06F 21/6218* (2013.01); *H04L 63/0807* (2013.01); *H04L 63/10* (2013.01); *H04L 67/2804* (2013.01); *H04L 67/38* (2013.01); *G06F 2221/2141* (2013.01); *H04L 67/1097* (2013.01); *H04L 67/2842* (2013.01)

(56) References Cited

U.S. PATENT DOCUMENTS

| | | |
|---|---|---|
| 9,237,195 B2 | 1/2016 | CaraDonna et al. |
| 2013/0159638 A1 | 6/2013 | Koinuma et al. |
| 2017/0090823 A1 | 3/2017 | Kan et al. |

FOREIGN PATENT DOCUMENTS

| | | |
|---|---|---|
| JP | 2013-140446 A | 7/2013 |
| JP | 2015-520890 A | 7/2015 |
| WO | 2014/141419 A1 | 9/2014 |
| WO | 2015/141219 A1 | 9/2015 |

OTHER PUBLICATIONS

International Search Report dated Jul. 18, 2017 issued by the International Searching Authority in No. PCT/JP2017/015426.
Written Opinion dated Jul. 18, 2017 issued by the International Searching Authority in No. PCT/JP2017/015426.

* cited by examiner

Fig. 2

113-1 CONVERSION TABLE

| LOGICAL COMPUTING MACHINE HOST NAME (IP ADDRESS) | ACCESS PATH | IN-LOCAL-LOGICAL-COMPUTING-MACHINE ACCESS PATH (CONVERTED ACCESS PATH) |
|---|---|---|
| Host1 (192.168.0.1) | /filesystem/sda | /filesystem/sda |
| Host2 (192.168.0.2) | /filesystem/sda | /filesystem/sdb |
| Host3 (192.168.0.3) | /filesystem/sda | /filesystem/sdc |
| ... | ... | ... |

ACCESS CONTROL DEVICE, ACCESS CONTROL METHOD, AND RECORDING MEDIUM CONTAINING ACCESS CONTROL PROGRAM

This application is a National Stage Entry of PCT/JP2017/015426 filed on Apr. 17, 2017, which claims priority from Japanese Patent Application 2016-088941 filed on Apr. 27, 2016, the contents of all of which are incorporated herein by reference, in their entirety.

TECHNICAL FIELD

The invention of the present application relates to a technique in which, in a system where a plurality of information processing devices share an information processing resource via an interconnect network, the each information processing device accesses the information processing resource.

BACKGROUND ART

In a data center or the like, along with rapid advance of cloud computing, a multi-node system in which a plurality of information processing devices (nodes) each including a central processing unit (CPU) and a memory device such as a memory are cluster-connected is rapidly growing on a large scale. In such a multi-node system, accessing the memory device from the CPU across the nodes at high speed is a problem, and expectation of a technique for solving the problem has been rising.

As a technique related to such a technique, PTL 1 discloses a virtual computing machine system which has a plurality of nodes including physical CPUs equipped with cache memories, and physical memories, and, when a virtual computing machine is actuated by generating a logical CPU and a logical partition from a virtual machine resource of the plurality of nodes, allocates a physical CPU to the logical CPU. The plurality of nodes in this system are communicably connected via an interconnect. This system measures performance information regarding performance of access to a physical memory from a logical CPU when a physical CPU to be allocated to a logical CPU is selected. This system selects a physical CPU to be allocated to a logical CPU from the same node as a previously allocated logical CPU when the performance information satisfies a predetermined threshold, and selects a physical CPU to be allocated to a logical CPU from a node different from a previously allocated logical CPU when the performance information does not satisfy a predetermined threshold.

Furthermore, PTL 2 discloses an information processing system including a memory at least partly settable as a shared memory region, a plurality of nodes each including one or more CPUs, and an interconnect which communicably connects the nodes. In this system, a first CPU has an access token table holding an access token for accessing a memory of another node, and transmits a memory access request with an access token added thereto. Moreover, a second CPU has a memory token register holding a memory token which controls permission of access to a memory in a local node from another node. In addition, the second CPU controls whether or not to permit memory access request execution, on the basis of the access token added to the memory access request from the first CPU, and the memory token held in the memory token register.

Still further, PTL 3 discloses an information processing device including a plurality of nodes each provided with a CPU and a memory, and an interconnect which communicably connects the nodes. The CPU performs address conversion from a logical address to a physical address, and converts the physical address into a CPU identification (CPUID) by which a CPU of each node is able to be identified. The CPU in each node transmits, via a crossbar switch, transfer data including the physical address converted from the logical address, and the CPUID converted from the physical address. In addition, when receiving transfer data from another node via the crossbar switch, the CPU determines whether a local region of a memory which the CPU accesses or a shared region is accessed, on the basis of a physical address included in the transfer data.

CITATION LIST

Patent Literature

[PTL 1] International Publication No. 2014-141419
[PTL 2] Japanese Unexamined Patent Application Publication No. 2013-140446
[PTL 3] Japanese Unexamined Patent Application Publication No. 2013-130976

Non Patent Literature

[NPL 1] "Spark Lightning-fast cluster computing", [Online], [retrieved on Apr. 14, 2016], Internet<URL: http://spark.apache.org/>

SUMMARY OF INVENTION

Technical Problem

In recent years, data analysis processing such as machine learning is generally performed for large-scale data. A mounting means of a typical framework that achieves such processing includes distributed processing middleware such as Hadoop (registered trademark) or Spark (registered trademark) (refer to NPL 1). Hadoop is middleware obtained by achieving MapReduce (registered trademark) by Google (registered trademark) Corporation as an open source. Spark is middleware which is an improvement of Hadoop, and systems using Spark tend to increase.

Such distributed processing middleware is developed on an assumption that the distributed processing middleware operates in a multi-node system in which a large number of computing machines (information processing devices) are connected by a communication network. FIG. 6 is a diagram exemplifying a configuration of such a general multi-node system. A multi-node system 3 exemplified in FIG. 6 is a system in which n (n is any integer of 2 or more) computing machines 70-1 to 70-$n$ are communicably connected by a computing machine network 20. The computing machine network 20 is a communication network such as Ethernet (registered trademark).

The computing machine 70-1 exemplified in FIG. 6 includes a processor 720-1, a memory 730-1, a memory device 740-1, and an internal bus 750-1. Configurations of the computing machines 70-2 to 70-$n$ are also similar to that of the computing machine 70-1. The processor 720-1 accesses the memory device 740-1 via the internal bus 750-1. When accessing the memory device 740-$i$ (i is an integer of any one of 2 to n), the processor 720-1 requests, via the computing machine network 20, the computing machine 70-$i$ to access the memory device 740-$i$. The computing machine 70-$i$ requested by the processor 720-1 accesses the memory device 740-*i* via the internal bus 750-*i*. Thus, access to the memory device 740-*i* from the processor 720-1 is achieved.

On the other hand, in recent years, a computing machine system equipped with an architecture called a resource-disaggregated architecture has been achieved. This resource-disaggregated architecture separates, as components included in a computing machine, hardware resources such as a CPU, a storage, a power source, and a network, thereby enabling replacement, addition, reduction, or the like of these components as necessary.

FIG. 7 is a diagram exemplifying a configuration of a multi-node system equipped with such a resource-disaggregated architecture. A multi-node system 4 exemplified in FIG. 7 is a system in which n computing machines 800-1 to 800-*n* are communicably connected by a computing machine network 20, as in the multi-node system 3 exemplified in FIG. 6. The multi-node system 4 includes an interconnect network 30 extending across the computing machines 800-1 to 800-*n*, instead of the internal buses 750-1 to 750-*n* provided in the multi-node system 3 illustrated in FIG. 6. The interconnect network is a communication network which connects, in such a way that a plurality of information processing devices (computing machines) are able to directly access a plurality of information processing resources in communication, the information processing devices and the information processing resources.

The computing machine 800-1 exemplified in FIG. 7 includes a processor 720-1 and a memory 730-1. Configurations of the computing machines 800-2 to 800-*n* are also similar to that of the computing machine 800-1. The processor 720-1 is able to directly access memory devices 740-1 to 740-*n* via the interconnect network 30.

There are many products of existing distributed processing middleware developed before appearance of the resource-disaggregated architecture exemplified in FIG. 7. Such distributed processing middleware cannot recognize a configuration in which the processors 720-1 to 720-*n* and the memory devices 740-1 to 740-*n* are connected by the interconnect network 30, as in the multi-node system 4 exemplified in FIG. 7.

In this case, in order for the distributed processing middleware to be able to operate in the multi-node system 4, logical computing machines (virtual computing machines) 80-1 to 80-*n* are constructed in the multi-node system 4, for example, as exemplified in FIG. 7. The logical computing machine 80-1 includes a computing machine 800-1, a memory device 740-1, and a part of an interconnect network 30. Then, the distributed processing middleware operating in the multi-node system 4 recognizes the logical computing machines 80-1 to 80-*n* equally to the computing machines 70-1 to 70-*n* in the multi-node system 3 exemplified in FIG. 6. In other words, the distributed processing middleware recognizes the multi-node system 4 as a system having an architecture equal to that of the multi-node system 3.

Therefore, in this case, when accessing a memory device in another logical computing machine, the processors 720-1 to 720-*n* request a logical computing machine of an access destination to access a memory device of an access destination, via the computing machine network 20, under control of the distributed processing middleware, even though the processors 720-1 to 720-*n* are originally capable of direct access via the interconnect network 30. The logical computing machine of the access destination which is requested executes access to the memory device of the access destination via the interconnect network 30. Therefore, in this case, there is a problem that the access performance degrades, and a resource of computing machines is excessively used due to communication between the computing machines resulting from access.

Furthermore, redesigning the distributed processing middleware in such a way as to cope with a resource-disaggregated architecture in order to avoid such a problem is not realistic in terms of cost required for redesigning, and the like. In other words, performing access across computing machines that is compatible with a resource-disaggregated architecture without redesigning the distributed processing middleware is a problem. PTLs 1 to 3 do not mention this problem. A main object of the invention of the present application is to provide an access control unit and the like which solve the problem.

Solution to Problem

An access control device according to one mode of the invention of the present application, which controls communication access in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks, the access control device including: a determination means for determining whether or not access performed by the first processor is the remote access; and a conversion means for, when the determination means determines that the access is the remote access, converting the remote access into the local access by updating access destination management information associating the second information processing resource with the second information processing device, in such a way as to associate the second information processing resource with the first information processing device.

In another aspect of achieving the object described above, an access control method according to one mode of the invention of the present application includes: in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks, by a third information processing device, determining whether or not access performed by the first processor is the remote access; and, when the access is determined to be the remote access, converting the remote access into the local access by updating access destination management information associating the second information processing resource with the second information processing device, in such a way as to associate the second information processing resource with the first information processing device.

Furthermore, in still another aspect of achieving the object described above, an access control program according to one mode of the invention of the present application causes a computer included in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks, to execute: determination processing of determining whether or not access performed by the first processor is the remote access; and conversion processing of, when the determination processing determines that the access is the remote access, converting the remote access into the local access by updating access destination management information associating the second information processing resource with the second information processing device, in such a way as to associate the second information processing resource with the first information processing device.

Furthermore, the invention of the present application can also be achieved by a computer-readable nonvolatile recording medium storing the access control program (computer program).

Advantageous Effects of Invention

The invention of the present application can avoid degradation of access performance and degradation of resource use efficiency when a multi-node system using a resource-disaggregated architecture performs data access across nodes under control of software or the like which is not compatible with a resource-disaggregated architecture.

BRIEF DESCRIPTION OF DRAWINGS

FIG. 2 is a diagram exemplifying a configuration of a conversion table 113-1 according to the first example embodiment of the invention of the present application.

EXAMPLE EMBODIMENT

Hereinafter, example embodiments of the invention of the present application will be described in detail with reference to the drawings.

First Example Embodiment

Figure 1:
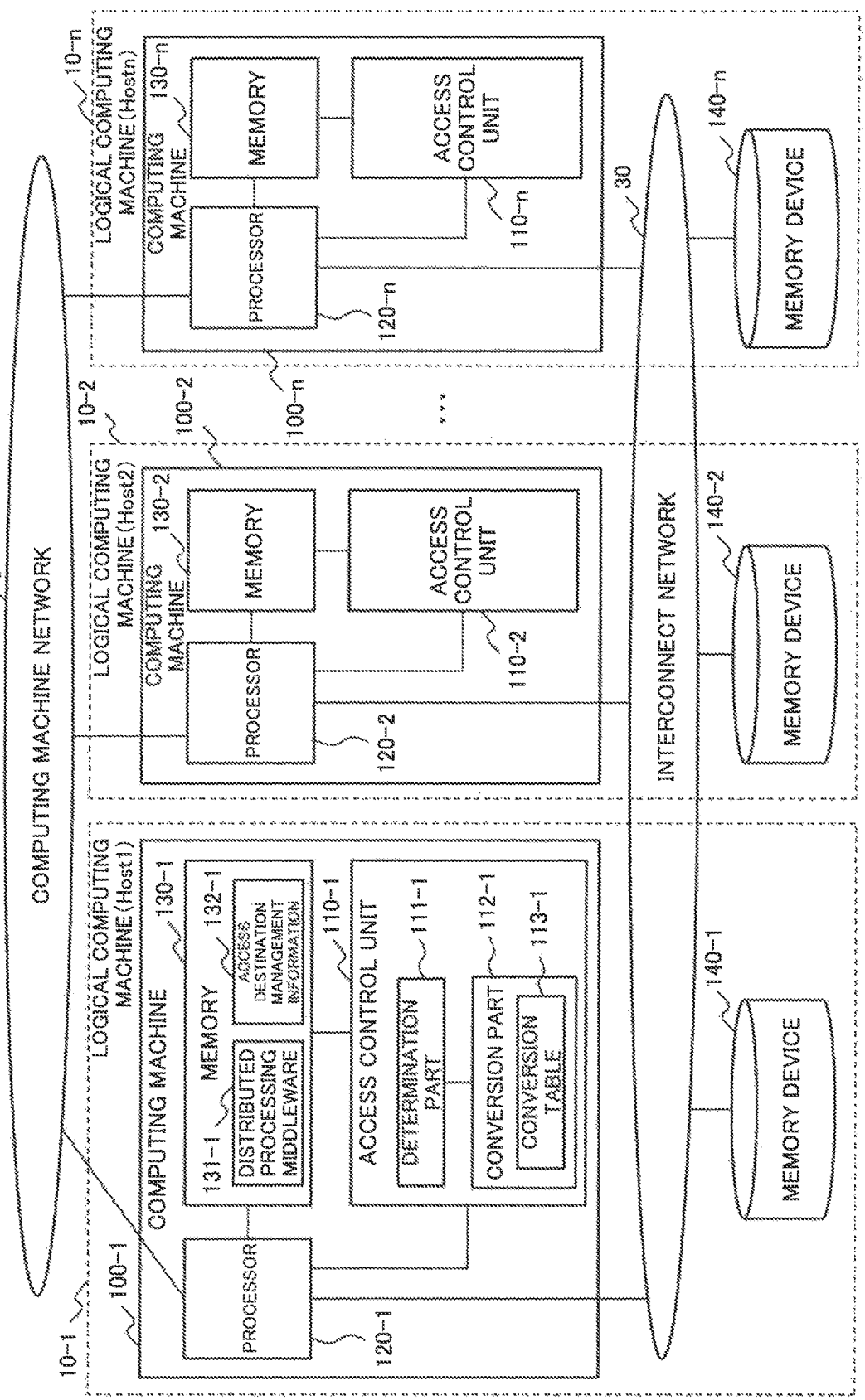
FIG. 1 is a block diagram illustrating a configuration of an access control system 1 according to a first example embodiment of the invention of the present application.

FIG. 1 is a block diagram conceptually illustrating a configuration of an access control system 1 according to a first example embodiment of the invention of the present application. The access control system 1 is a multi-node system in which n (n is an integer of 2 or more) computing machines 100-1 to 100-$n$ are communicably connected by a computing machine network 20. The computing machine network 20 is a communication network compatible with, for example, transmission control protocol/internet protocol (TCP/IP), and is achieved by an Ethernet cable, an Ethernet switch, or the like. The computing machine network 20 is connected to the computing machines 100-1 to 100-$n$ via network interface cards (NIC) (not illustrated) provided in of the computing machines 100-1 to 100-$n$. The network interface cards may be connected via an interconnect network 30 described later.

The computing machine 100-1 includes an access control unit 110-1, a processor 120-1, and a memory 130-1. Configurations and functions of the computing machines 100-2 to 100-$n$ are similar to that of the computing machine 100-1, and therefore, descriptions of the computing machines 100-2 to 100-$n$ are omitted by the description of the computing machine 100-1 in the present application.

The computing machines 100-1 to 100-$n$ are communicably connected to the interconnect network 30 extending across the computing machines. The processor 120-1 is able to directly access memory devices 140-1 to 140-$n$ communicably connected to the interconnect network 30. In other words, the access control system 1 is a multi-node system compatible with the resource-disaggregated architecture described above.

The interconnect network 30 is achieved by an optical cable and an optical switch compatible with standards such as Fibre Channel and fibre channel over ethenet (FCoE) (registered trademark). Alternatively, the interconnect network 30 may be achieved by normal Ethernet, or ExpEther (registered trademark). ExpEther is an existing technique which configures, by Ethernet, a peripheral component interconnect (PCI) express network being a high-speed and general-purpose standard.

The memory devices 140-1 to 140-$n$ each include an interface control function connectable to the interconnect network 30, and a memory device. The memory device is, for example, a flash memory, a dynamic random access memory (DRAM), a magnetoresistive random access memory (MRAM), a hard disk drive (HDD) or the like. The memory devices 140-1 to 140-$n$ may each include, for example, a solid state drive (SSD) connected by a PCI express interface. The memory devices 140-1 to 140-$n$ may each include a redundant arrays of inexpensive disks (RAID) card connected to a plurality of HDDs or SSDs, a general-purpose computing on graphics processing units (GPGPU) card provided with a storage function, a computation board based on a many integrated core (MIC) (registered trademark) architecture such as Intel Xeon Phi (registered trademark), or the like.

The processor 120-1 executes distributed processing middleware 131-1 stored in the memory 130-1. The distributed processing middleware 131-1 is middleware such as Hadoop or Spark. The distributed processing middleware 131-1 includes a function of executing processing (task) such as a Map/Reduce function which undergoes distributed processing by the computing machines 100-1 to 100-$n$, or performing inter-task synchronous control or the like in execution of an application. The distributed processing middleware 131-1 includes a function of, in response to a request from a scheduler executed in the computing machines 100-1 to 100-$n$, starting execution of a task indicated by the request.

It is assumed that the distributed processing middleware 131-1 according to the present example embodiment is not compatible with a resource-disaggregated architecture. In other words, the distributed processing middleware 131-1 is not able to recognize a configuration in which the processors 120-1 to 120-$n$ and the memory devices 140-1 to 140-$n$ are connected by the interconnect network 30.

Therefore, in the access control system 1 according to the present example embodiment, logical computing machines 10-1 to 10-$n$ are constructed by, for example, software or the like which controls the construction of the logical computing machines, in order for the distributed processing middleware 131-1 to be able to recognize the configuration of the system. The logical computing machine 10-1 includes the computing machine 100-1, the memory device 140-1, and a part of the interconnect network 30. Configurations and functions of the logical computing machines 10-2 and 10-$n$ are similar to that of the logical computing machine 10-1. Note that the logical computing machines 10-1 to 10-$n$ each individually include one of the memory devices 140-1 to 140-$n$ in the configuration exemplified in FIG. 1, but, for example, at least one of the logical computing machines may include a plurality of memory devices. It is assumed that host names "Host 1" to "Host n" are given to the logical computing machines 10-1 to 10-$n$ in order by a system manager or the like as identifiers by which the respective logical computing machines are able to be identified.

Figure 6:
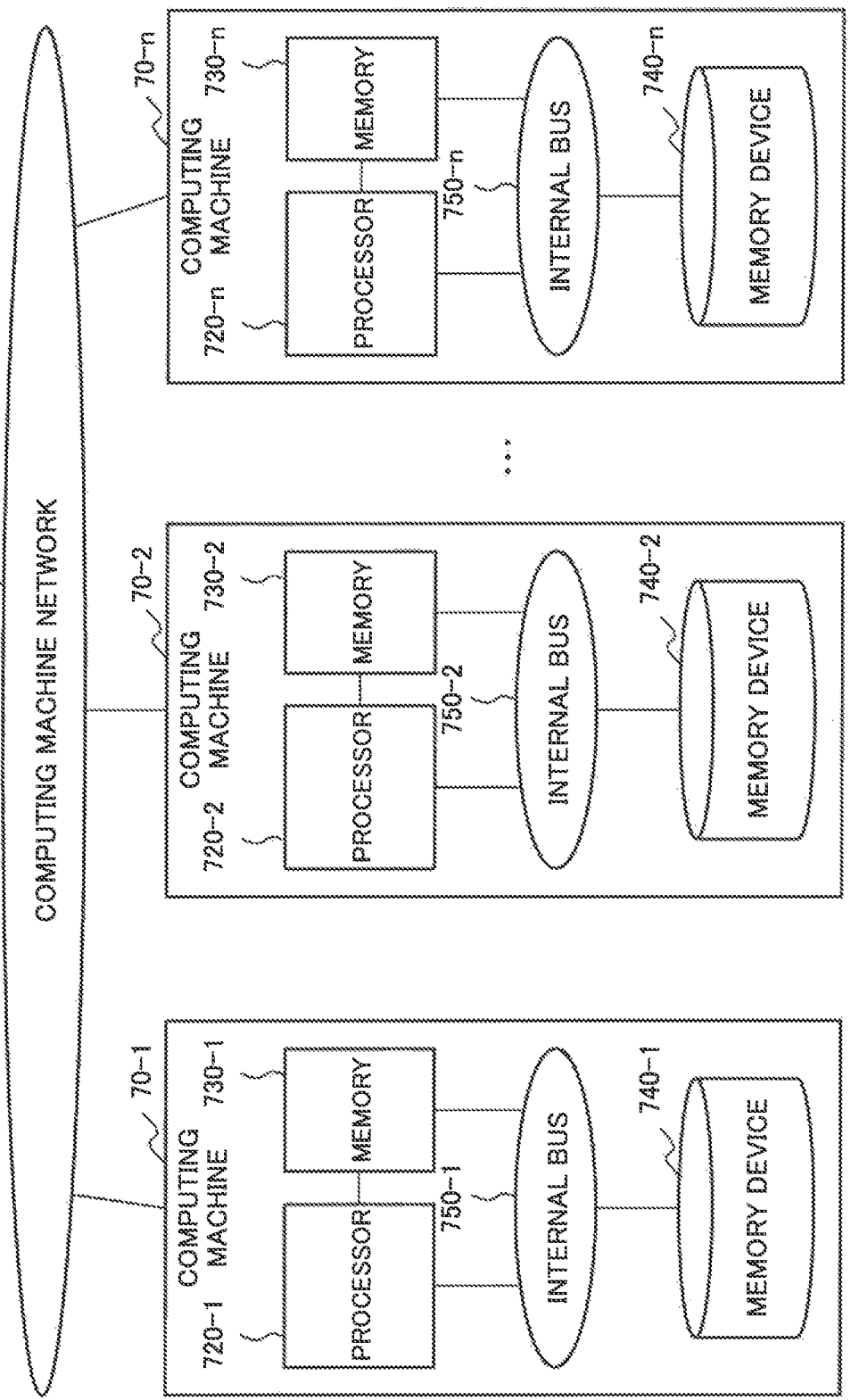
FIG. 6 is a diagram exemplifying a configuration of a general multi-node system 3 which does not use a resource-disaggregated architecture.

The distributed processing middleware 131-1 recognizes the configuration of the access control system 1 illustrated in FIG. 1 as a system equal to the multi-node system 3 exemplified in FIG. 6 (i.e., a system in which a plurality of computing machines each including a processor and a memory device are connected by the computing machine network 20). Therefore, the distributed processing middleware 131-1 includes a function of controlling in such a way that access to the memory device 140-$i$ (i is an integer of any one of 2 to n) from the processor 120-1 is performed by requesting the logical computing machine 10-$i$ via the computing machine network 20. In this instance, the logical computing machine 10-$i$ which has been requested accesses the memory device 140-$i$ via the interconnect network 30. The distributed processing middleware 131-1 includes a function of controlling access to the memory device 140-1 from the processor 120-1 in such a way that the access is performed via the interconnect network 30.

The access control unit 110-1 provided in the computing machine 100-1 includes a determination part 111-1 and a conversion part 112-1.

The determination part 111-1 checks whether or not classification information, which is included in an instruction (request) issued from the processor 120-1, and by which a classification of the instruction is able to be distinguished, has a particular value, thereby determining whether or not the instruction is an instruction for access to one of the memory devices 140-1 to 140-$n$. An instruction issued from the processor 120-1 and other than an instruction for access to one of the memory devices 140-1 to 140-$n$ includes, for example, an inter-processor communication instruction to at least one of the processors 120-2 to 120-$n$ or the like.

When the instruction is an instruction for access to one of the memory devices 140-1 to 140-$n$, the determination part 111-1 checks whether the instruction is an instruction for access (local access) to the memory device 140-1, or an instruction for access (remote access) to one of the memory devices 140-2 to 140-$n$. Note that local access refers to access in which a processor and a memory device of an access destination are present in the same logical computing machine, and remote access refers to access in which a processor and a memory device of an access destination are present in different logical computing machines. The determination part 111-1 notifies the conversion part 112-1 of a result of checking.

When a determination result by the determination part 111-1 indicates remote access, the conversion part 112-1 performs processing of converting (emulating) the remote access instruction into a local access instruction, on the basis of the conversion table 113-1.

FIG. 2 is a diagram exemplifying a configuration of the conversion table 113-1 according to the present example embodiment. As exemplified in FIG. 2, the conversion table 113-1 is information in which a logical computing machine host name (IP address), an access path, and an in-local-logical-computing-machine access path (converted access path) are associated with one another.

The access path in the conversion table 113-1 indicates a path through which the memory device 140-$i$ is mounted in the logical computing machine 10-$i$ (i is an integer of any one of 1 to n). As exemplified in FIG. 2, in the present example embodiment, all paths through which the memory device 140-1 in the logical computing machine 10-1, the memory device 140-2 in the logical computing machine 10-2, and the memory device 140-3 in the logical computing machine 10-3 are mounted are "/filesystem/sda".

The in-local-logical-computing-machine access path in the conversion table 113-1 indicates a path when the memory device 140-$i$ is mounted in the logical computing machine 10-1. As exemplified in FIG. 2, in the present example embodiment, paths through which the memory devices 140-1 to 140-3 are mounted in the logical computing machine 10-1 are "/filesystem/sda", "/filesystem/sdb", and "/filesystem/sdc", in order.

For example, when an access destination indicated by a remote access instruction issued from the processor 120-1 is "Host2:/filesystem/sda/hoge/fuga-001", the conversion part 112-1 operates as follows. In other words, the conversion part 112-1 converts "Host2" included in the access destination into "Host1" which is a host name of the local logical computing machine. On the basis of a record regarding "/filesystem/sda" of "Host2" in the conversion table 113-1, the conversion part 112-1 converts "/filesystem/sda" included in the access destination into "/filesystem/sdb". Thereby, the conversion part 112-1 converts the access destination from "Host2:/filesystem/sda/hoge/fuga-001" to "Host1:/filesystem/sdb/hoge/fuga-001". In this way, the remote access instruction issued from the processor 120-1 is converted (emulated) into a local access instruction by the conversion part 112-1. The conversion part 112-1 reflects contents of the processing of converting the remote access instruction into the local access instruction, in access destination management information 132-1 stored in the memory 130-1

The access destination management information 132-1 is information to which the processor 120-1 refers when accessing one of the memory devices 140-1 to 140-n by executing the distributed processing middleware 131-1 or application software (not illustrated), and by which a place of an access destination is managed. The access destination management information 132-1 is, for example, information which the processor 120-1 obtains when accessing one of the memory devices 140-1 to 140-n by an arrangement of managing a host name, an IP address, and the like in a communication network. Such an arrangement of managing a host name, an IP address, and the like is, for example, a domain name system (DNS), or a "/etc/hosts file" or the like in a file system of an operating system.

Alternatively, when a metadata server is present in the access control system 1, the access destination management information 132-1 is information managed by the metadata server. The metadata server is an arrangement which, in a general distributed file system or the like, receives a file path of an access destination, and then returns an address of a computing machine of the access destination, and a local path in the computing machine. In a distributed file system for Hadoop called Hadoop distributed file system (HDFS) (registered trademark), NameNode (registered trademark) is equivalent to this metadata server.

Furthermore, Spark includes modules called BlockManager (registered trademark) and Broadcast (registered trademark) which manage a node (computing machine) holding data inside a program. In this case, the access destination management information 132-1 is information managed by these modules.

On the basis of the access destination management information 132-1 updated by the conversion part 112-1 as described above, the processor 120-1 performs local access to one of the memory devices 140-2 to 140-n being an access destination via the interconnect network 30.

Figure 3:
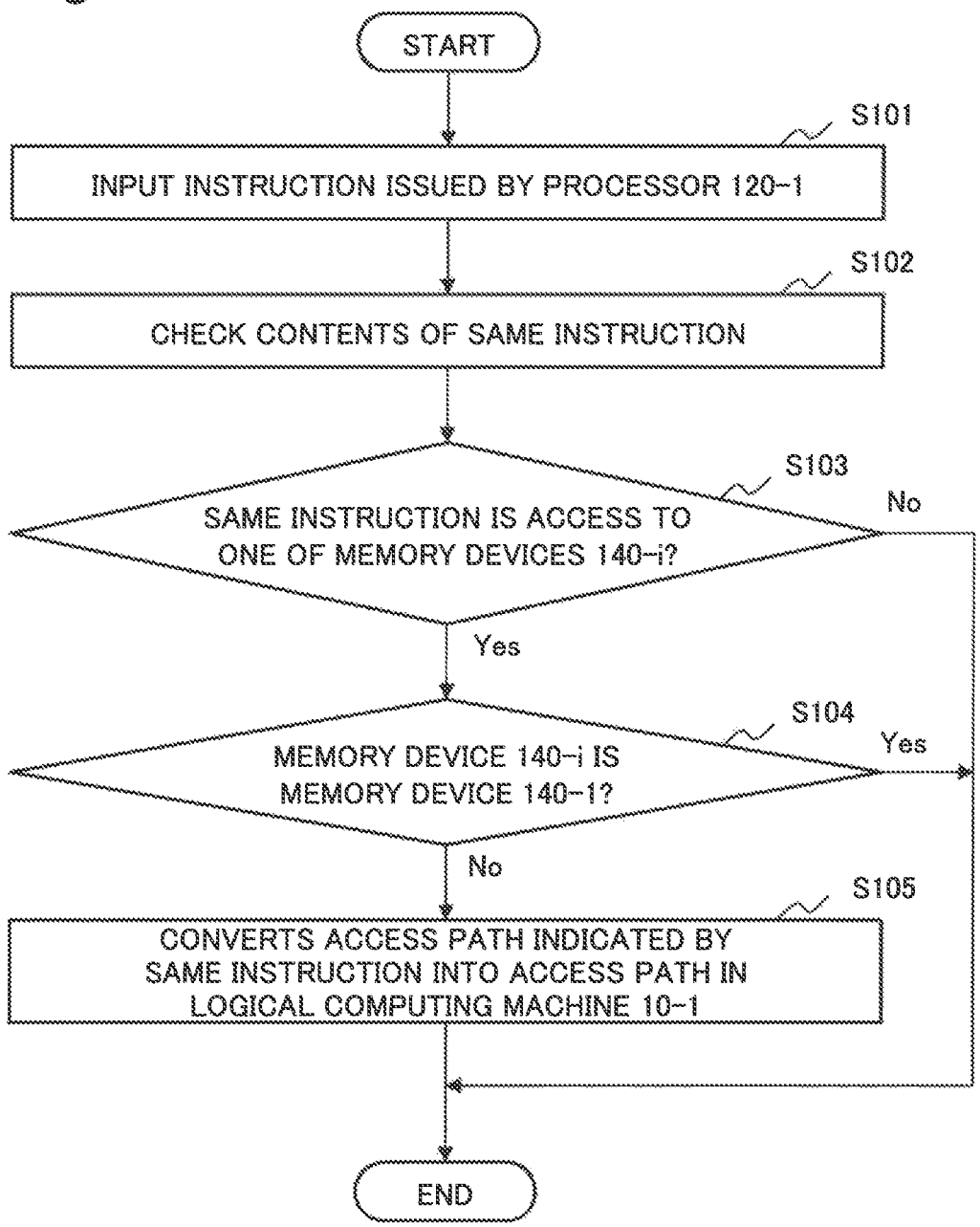
FIG. 3 is a flowchart illustrating an operation of an access control unit 110-1 according to the first example embodiment of the invention of the present application.

Next, an operation (processing) of the access control unit 110-1 according to the present example embodiment is described in detail with reference to a flowchart in FIG. 3.

An instruction issued from the processor 120-1 is input to the access control unit 110-1 (step S101). The determination part 111-1 checks contents of the instruction (step S102). When the instruction is not access to one of the memory devices 140-i (i is an integer of any one of 1 to n) (i.e., inter-processor communication or the like) (No in step S103), the whole processing ends. When the instruction is access to one of the memory devices 140-i (Yes in step S103), the processing proceeds to step S104.

When the memory device 140-i is the memory device 140-1 (Yes in step S104), the whole processing ends. When the memory device 140-i is not the memory device 140-1 (i.e., the memory devices 140-2 to 140-n) (No in step S104), the conversion part 112-1 converts the access path indicated by the instruction into an access path in the logical computing machine 10-1 by updating the access destination management information 132-1 (step S105), and the whole processing ends.

The access control unit 110-1 according to the present example embodiment can avoid degradation of access performance and degradation of resource use efficiency when a multi-node system using a resource-disaggregated architecture performs data access across nodes under the control of software or the like which is not compatible with a resource-disaggregated architecture. The reason is that, when an instruction issued from the processor 120-1 is an instruction for remote access to the memory devices 140-2 to 140-n, the access control unit 110-1 converts the remote access instruction into a local access instruction by updating the access destination management information 132-1.

Hereinafter, advantageous effects achieved by the access control unit 110-1 according to the present example embodiment are described in detail.

In recent years, a computing machine system equipped with a resource-disaggregated architecture has been achieved. There are many products of existing distributed processing middleware developed before appearance of the resource-disaggregated architecture. Such distributed processing middleware cannot recognize a configuration in which a processor and a memory device are connected by an interconnect network as exemplified in FIG. 7.

Figure 7:
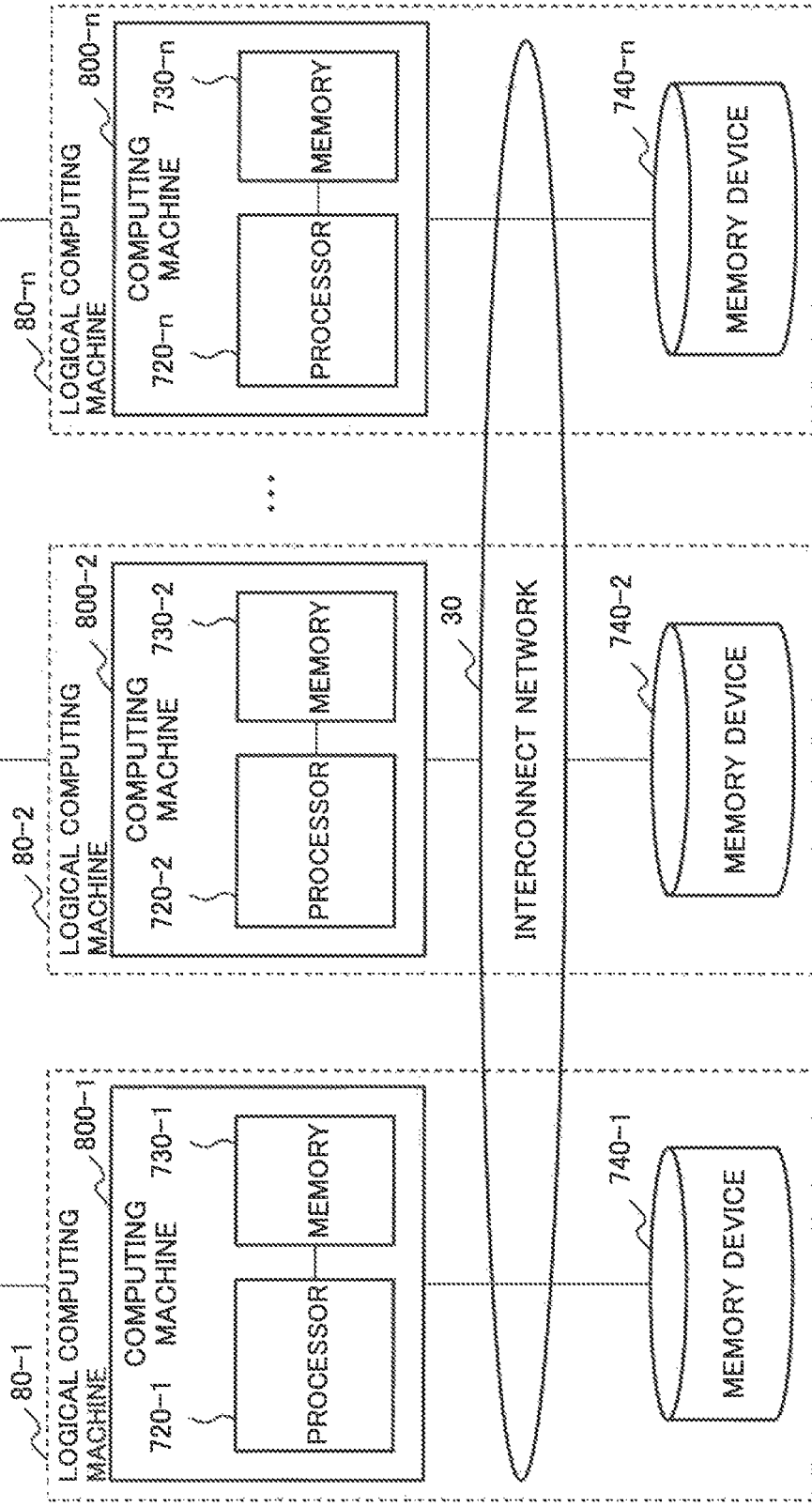
FIG. 7 is a diagram exemplifying a configuration of a general multi-node system 4 using a resource-disaggregated architecture.

Thus, when a logical computing machine is constructed as exemplified in FIG. 7, the distributed processing middleware recognizes the multi-node system 4 exemplified in FIG. 7 as a system having an architecture equal to that of the multi-node system 3 exemplified in FIG. 6. In this case, the multi-node system 4 performs remote access from a processor by requesting a logical computing machine of an access destination via the computing machine network 20 under the control of the distributed processing middleware, even though the multi-node system 4 is originally capable of performing the remote access via the interconnect network 30. Accordingly, degradation of the access performance, and excessive use of a resource of computing machines resulting from communication between computing machines by access become problems.

In order to cope with such problems, in the access control unit 110-1 according to the present example embodiment, the determination part 111-1 determines whether or not access performed by the processor 120-1 is remote access. When the determination part 111-1 determines that the access is remote access, the conversion part 112-1 converts (emulates) the remote access into local access. The conversion part 112-1 performs this conversion by updating the access destination management information 132-1 associating the memory device 140-i being an access destination with the logical computing machine 10-i, in such a way as to associate the memory device 140-i with the logical computing machine 10-1. Thus, the access control unit 110-1 according to the present example embodiment can avoid degradation of access performance and degradation of resource use efficiency when a multi-node system using a resource-disaggregated architecture performs data access across nodes under the control of software or the like which is not compatible with a resource-disaggregated architecture. Moreover, the access control unit 110-1 according to the present example embodiment can avoid increase of cost resulting from redesigning distributed processing middleware in such a way as to cope with a resource-disaggregated architecture.

Furthermore, in the access control unit 110-1 according to the present example embodiment, the determination part 111-1 determines whether or not an instruction issued from the processor 120-1 is an instruction for remote access to the memory device 140-i (i is an integer of any one of 2 to n). When the instruction is a remote access instruction, the conversion part 112-1 performs processing of converting the remote access instruction into a local access instruction. In other words, when the instruction is an inter-processor communication instruction or the like to the logical computing machine 10-i (i.e., is not an instruction for access to a memory device), the access control unit 110-1 does not perform processing of converting from remote access into local access. Consequently, the access control unit 110-1 according to the present example embodiment can appropriately perform processing of converting from remote access into local access.

Note that the access control system 1 according to the present example embodiment may be a system in which a plurality of host names are given to the same logical computing machine. In this case, the processor 120-1 may enclose different host names in, for example, an instruction for access to the memory device 140-*i*, and an inter-processor communication instruction to the logical computing machine 10-*i*. In this case, a host name corresponds to classification information by which a classification of an instruction is able to be distinguished. Thus, the access control unit 110-1 is able to control whether or not to perform processing of converting from remote access into local access by a host name included in an instruction issued from the processor 120-1.

Furthermore, when the memory devices 140-1 to 140-*n* according to the present example embodiment are storage devices, and the computing machine 100-*i* (i is any integer of 1 to n) includes, in, for example, the memory 130-*i*, a storage cache storing data on access to the memory device 140-*i*, the access control unit 110-1 may operate as follows. Specifically, the determination part 111-1 determines whether or not data targeted for remote access are in the storage cache, by performing inter-processor communication with a logical computing machine being an access destination. When data targeted for remote access are in the storage cache, the conversion part 112-1 stops the above-described conversion from remote access into local access.

When data targeted for remote access are in a storage cache, the processor 120-1 can obtain the data by causing the data to be transferred from a processor in a logical computing machine being an access destination. In general, time required to access a storage device is longer than time required to access a memory. Therefore, when data targeted for remote access are in a storage cache, time required to obtain data is shorter when data stored in the storage cache are transferred from a processor of an access destination than when local access via the interconnect network 30 is performed. Thus, the access control unit 110-1 according to the present example embodiment can avoid degradation of access performance when data targeted for remote access are present in a storage cache.

Second Example Embodiment

Figure 4:
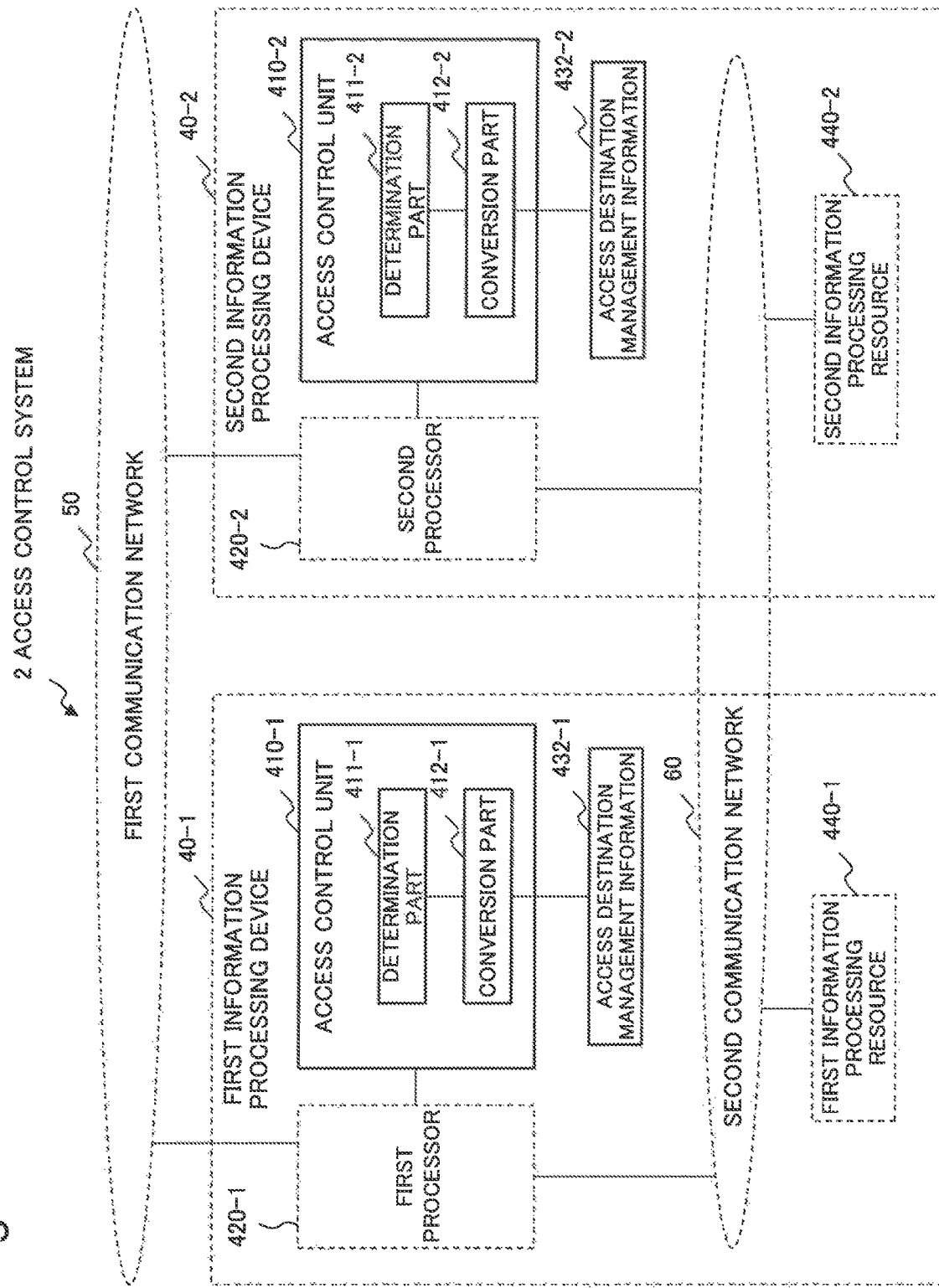
FIG. 4 is a block diagram illustrating a configuration of an access control unit 410-1 according to a second example embodiment of the invention of the present application.

FIG. 4 is a block diagram conceptually illustrating a configuration of an access control unit 410-1 according to a second example embodiment of the invention of the present application. The access control unit 410-1 is a device which controls communication access in an access control system 2.

In the access control system 2, a first processor 420-1 included in a first information processing device 40-1, and a second processor 420-2 included in a second information processing device 40-2 are communicably connected by a first communication network 50. The first processor 420-1, a first information processing resource 440-1 included in the first information processing device 40-1, and a second information processing resource 440-2 included in the second information processing device 40-2 are communicably connected by a second communication network 60.

The access control system 2 is configured in such a way that local access to the first information processing resource 440-1 from the first processor 420-1 is performed via the second communication network 60. The access control system 2 is configured in such a way that remote access to the second information processing resource 440-2 from the first processor 420-1 is performed via the first communication network 50 and the second communication network 60.

The access control unit 410-1 according to the present example embodiment includes a determination part 411-1 and a conversion part 412-1.

The determination part 411-1 determines whether or not access performed by the first processor 420-1 is remote access.

When the determination part 411-1 determines that the access is remote access, the conversion part 412-1 updates access destination management information 432-1 associating the second information processing resource 440-2 with the second information processing device 40-2, in such a way as to associate the second information processing resource 440-2 with the first information processing device 40-1. Thereby, the conversion part 412-1 converts remote access into local access.

The access control unit 410-1 according to the present example embodiment can avoid degradation of access performance and degradation of resource use efficiency when a multi-node system using a resource-disaggregated architecture performs data access across nodes under the control of software or the like which is not compatible with a resource-disaggregated architecture. The reason is that, when an instruction issued from the first processor 420-1 is an instruction for remote access to the second information processing resource 440-2, the access control unit 410-1 converts the remote access instruction into a local access instruction by updating the access destination management information 432-1.

<Hardware Configuration Example>

Each part in the access control units (devices) illustrated in FIGS. 1 and 4 in the respective example embodiments described above can be achieved by exclusive hardware (HW) (electronic circuit). Moreover, in FIGS. 1 and 4, the following configuration can be considered as a function (processing) unit (software module) of a software program.

Determination parts 111-1 and 411-1,

Conversion parts 112-1 and 412-1,

However, division of the respective parts illustrated in the drawings is a configuration convenient for description, and various configurations can be assumed at a time of mounting. One example of a hardware environment in this case is described with reference to FIG. 5.

Figure 5:
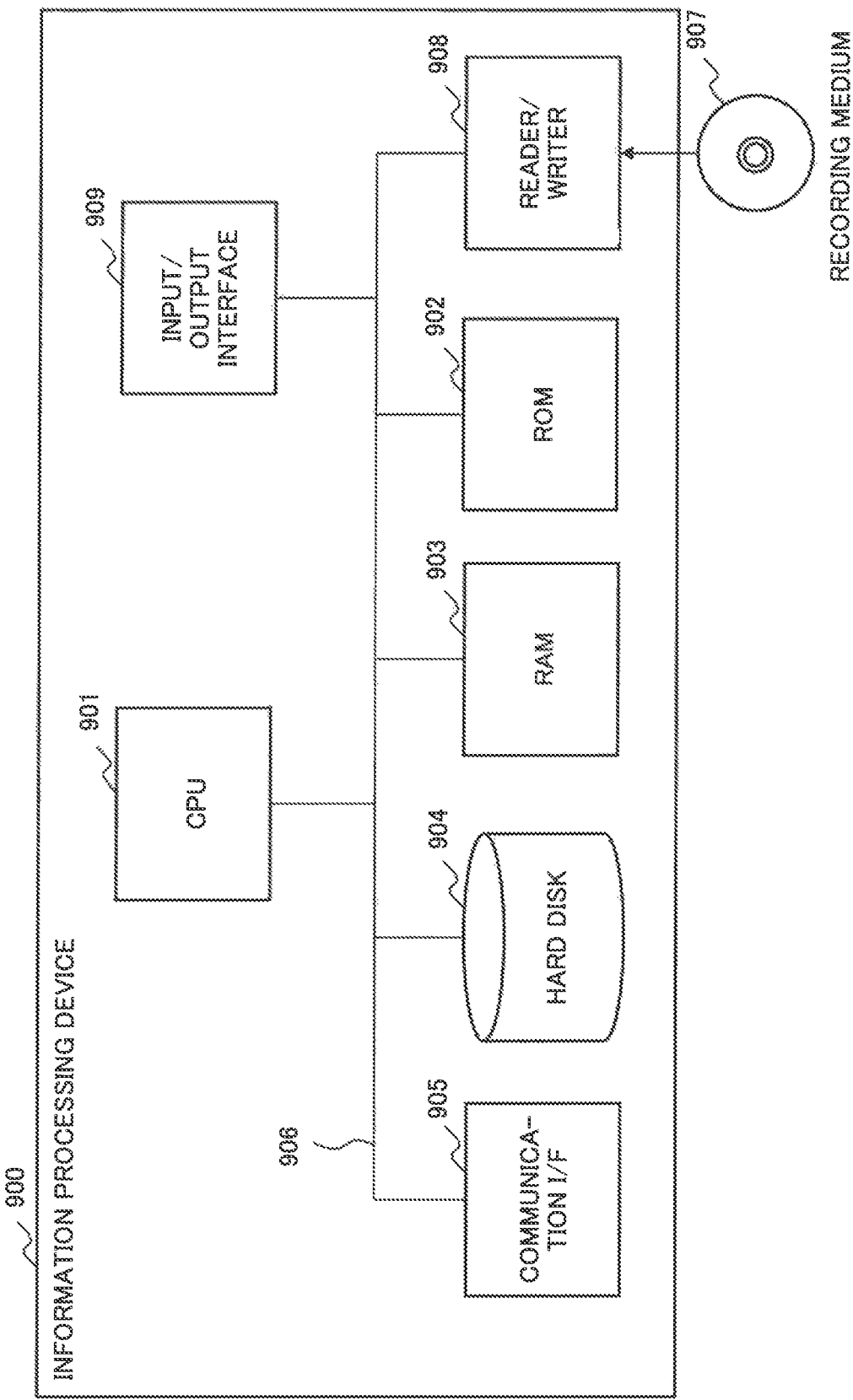
FIG. 5 is a block diagram illustrating a configuration of an information processing device being capable of executing an access control unit according to each example embodiment of the invention of the present application.

FIG. 5 is a diagram exemplarily illustrating a configuration of an information processing device 900 (computer) being capable of executing the access control unit according to each example embodiment of the invention of the present application. Specifically, FIG. 5 represents a hardware environment which is a configuration of a computer (information processing device) being capable of achieving the access control units illustrated in FIGS. 1 and 4, and which is capable of achieving each function in the example embodiments described above.

The information processing device 900 illustrated in FIG. 5 includes the followings as components.

central processing unit (CPU) 901, read only memory (ROM) 902, random access memory (RAM) 903, hard disk (memory device) 904, communication interface 905 with external device bus 906 (communication line), reader/writer 908 being capable of reading and writing data contained in a recording medium 907 such as a compact disc read only memory (CD-ROM), and input/output interface 909.

In other words, the information processing device 900 including the components described above is a general computer in which the configurations are connected via the bus 906. The information processing device 900 includes a plurality of CPUs 901 in one case, or includes a multi-core CPU 901 in another case.

In addition, the invention of the present application described with the above-described example embodiments as examples supplies the information processing device 900 illustrated in FIG. 5 with a computer program enabling the following functions to be achieved. The functions are the above-described configurations in the block configuration diagrams (FIGS. 1 and 4) with which reference has been made in the description of the example embodiments, or functions in the flowchart (FIG. 3). Thereafter, the invention of the present application is accomplished by reading the computer program in the CPU 901 of the hardware, and then interpreting and executing the computer program. Moreover, the computer program supplied into the device needs only to be contained in a readable and writable volatile memory (RAM 903), or a nonvolatile memory device such as the ROM 902 or the hard disk 904.

Moreover, in the case described above, a general procedure can be adopted at present as a method of supplying a computer program into the hardware. The procedure includes, for example, a method of installing into the device via various recording media 907 such as a CD-ROM, and a method of externally downloading via a communication line such as the Internet. Further, in such a case, the invention of the present application can be considered as being configured by a code constituting the computer program, or the recording medium 907 containing the code.

The invention of the present application has been described so far with the above example embodiments by way of model example. However, the invention of the present application is not limited to the example embodiments described above. In other words, various aspects that can be understood by a person skilled in the art are applicable to the invention of the present application within the scope of the invention of the present application.

This application is based upon and claims the benefit of priority from Japanese patent application No. 2016-088941, filed on Apr. 27, 2016, the disclosure of which is incorporated herein in its entirety by reference.

REFERENCE SIGNS LIST

1 Access control system
2 Access control system
3 Multi-node system
4 Multi-node system
10-1 to 10-*n* Logical computing machine
100-1 to 100-*n* Computing machine
110-1 Access control unit
111-1 Determination part
112-1 Conversion part
113-1 Conversion table
120-1 to 120-*n* Processor
130-1 Memory
131-1 Distributed processing middleware
132-1 Access destination management information
140-1 to 140-*n* Memory device
20 Computing machine network
30 Interconnect network
40-1 First information processing device
40-2 Second information processing device
410-1 Access control unit
411-1 Determination part
412-1 Conversion part
420-1 First processor
420-2 Second processor
432-1 Access destination management information
440-1 First information processing resource
440-2 Second information processing resource
50 First communication network
60 Second communication network
70-1 to 70-*n* Computing machine
720-1 Processor
730-1 Memory
740-1 Memory device
750-1 Internal bus
80-1 to 80-*n* Logical computing machine
800-1 to 800-*n* Computing machine
900 Information processing device
901 CPU
902 ROM
903 RAM
904 Hard disk (memory device)
905 Communication interface
906 Bus
907 Recording medium
908 Reader/writer
909 Input/output interface

What is claimed is:

1. An access control device which controls communication access in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks, the access control device comprising:

a determination unit configured to, when the first processor gives a different value as an identifier by which the second information processing device is able to be identified according to a classification of the remote access, determine whether or not the identifier being classification information by which the classification of the remote access is able to be distinguished indicates the particular value; and a conversion unit configured to, when the determination unit determines that the access is the remote access whose classification information indicates the particular value, convert the remote access into the local access by updating access destination management information associating the second information processing resource with the second information processing device, in such a way as to associate the second information processing resource with the first information processing device.

2. The access control device according to claim 1, wherein the conversion unit converts the remote access into the local access by updating the access destination management information managed by a domain name system, or a file system of an operating system.

3. The access control device according to claim 1, wherein the conversion unit converts the remote access into the local access by updating the access destination management information managed by a metadata server.

4. The access control device according to claim 1, wherein the conversion unit converts the remote access into the local access by updating the access destination management information managed by a module included in distributed processing middleware executed by the first information processing device.

5. The access control device according to claim 1, wherein,
when the second information processing device includes a storage cache storing data on access to the second information processing resource being a storage device, the determination unit determines whether or not data targeted for the remote access are in the storage cache, and
the conversion unit stops conversion from the remote access into the local access when data targeted for the remote access are in the storage cache.

6. An access control device according to claim 1 further comprising:
the first and second information processing devices; and
the first and second communication networks.

7. An access control method comprising: in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks,
by a third information processing device,
when the first processor gives a different value as an identifier by which the second information processing device is able to be identified according to a classification of the remote access, determining whether or not the identifier being classification information by which the classification of the remote access is able to be distinguished indicates the particular value; and,
when the access is determined to be the remote access whose classification information indicates the particular value, converting the remote access into the local access by updating access destination management information associating the second information processing resource with the second information processing device, in such a way as to associate the second information processing resource with the first information processing device.

8. A non-transitory computer readable recording medium storing an access control program causing a computer included in a system configured in such a way that a first processor included in a first information processing device and a second processor included in a second information processing device are communicably connected by a first communication network, the first processor, a first information processing resource included in the first information processing device and a second information processing resource included in the second information processing device are communicably connected by a second communication network, local access to the first information processing resource from the first processor is performed via the second communication network, and remote access to the second information processing resource from the first processor is performed via the first and second communication networks, to execute
determination processing of, when the first processor gives a different value as an identifier by which the second information processing device is able to be identified according to a classification of the remote access, determining whether or not the identifier being classification information by which the classification of the remote access is able to be distinguished indicates the particular value; and
conversion processing of, when the determination processing determines that the access is the remote access whose classification information indicates the particular value, converting the remote access into the local access by updating access destination management information associating the second information processing resource with the second information processing device, in such a way as to associate the second information processing resource with the first information processing device.

* * * * *